United States Patent Office 3,386,971
Patented June 4, 1968

3,386,971
MOLDABLE POLYSULFONES
John B. Gardner, Billy G. Harper and William S. Pickle, Lake Jackson, Tex., assignors to The Dow Chemical Company, Midland, Mich., a corporation of Delaware
No Drawing. Filed July 16, 1965, Ser. No. 472,655
4 Claims. (Cl. 260—79.3)

ABSTRACT OF THE DISCLOSURE

A moldable thermoplastic copolymer comprising the reaction product of sulfur dioxide and an ethylenically unsaturated ester having the formula

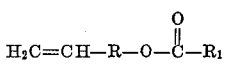

wherein R is selected from the group consisting of alkylene and cycloalkylene groups having from 1 to 10 carbon atoms and $R_1$ is selected from the group consisting of alkyl, cycloalkyl and aryl groups having 1 to 20 carbon atoms.

---

The present invention relates to polymeric reaction products and more particularly to compositions obtainable by the reaction of sulfur dioxide with ethylenically unsaturated esters.

Copolymers of sulfur dioxide and α-olefins, sometimes referred to as polysulfones, may be prepared as described in published literature, e.g., U.S. Patents 2,136,389, 2,602,787 and 2,797,205 and J. Am. Chem. Soc., vol. 65, pages 2417 and 2418 (1943).

The known polysulfones, especially the copolymers of sulfur dioxide and short chain olefins such as propylene, are generally not heat stable above their melting points and, therefore, are not moldable.

In accordance with the present invention, heat stable, moldable polysulfones are prepared by reacting sulfur dioxide with allyl esters having the general formula

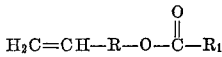

wherein R is an alkylene group having from 1 to 10 carbon atoms and $R_1$ is an alkyl, cycloalkyl or aryl group having 1 to 20 carbon atoms.

Illustrative examples of ethylenically unsaturated esters which may be reacted with sulfur dioxide to prepare the polysulfones of the present invention include allyl esters such as allyl heptanoate and allyl stearate, 5-hexenyl hexanoate, 6-heptenyl nonanoate, 9-decenyl undecanoate, allyl cyclohexane carboxylate, 5-hexenyl cyclohexane carboxylate, 9-decenyl cyclohexane carboxylate, allyl cyclohexylpropionate, 4-pentyl cyclohexylvalerate, 9-decenyl cyclohexylundecanoate, allyl benzoate, allyl p-toluate, allyl p-pentyl benzoate, 3-butenyl benzoate, 11-dodecenyl benzoate and the like.

The polymerization can be carried out in a liquid employing an excess of liquid $SO_2$ as the reaction medium. Alternatively, an inert solvent such as kerosene or hexane can be used. Polymerization can be effected by aid of irradiation or by the presence of a chemical catalyst.

When irradiation is employed, the amount of radiation used is from about 0.02 to about 5.0 megarads, and preferably from 0.1 to 0.5 megarad. Any convenient source of gamma rays or high velocity electrons is satisfactory. The rate of radiation may be varied within known practical limits. A chemical catalyst may also optionally be present to supplement polymerization by irradiation, if desired. However, irradiation without the aid of chemical catalyst is a fully satisfactory procedure for effecting polymerization of the $SO_2$ and ethylenically unsaturated ester mixture.

Among chemical catalysts to employ to prepare the polymer are ionic-type catalysts, e.g., $AgNO_3$, $LiNO_3$, and $NH_4NO_3$ (sometimes referred to as a redox catalyst) and the peroxide-type free-radical initiating catalysts, e.g. methyl ethyl ketone peroxide. When an ionic type is employed, the amount is generally from about 0.001 to about 0.5 percent and when the free-radical initiating type is employed, the amount is usually from about 0.05 to 5.0 percent, based on the weight of the unsaturated ester present.

In preparing the polysulfones of the present invention, it is generally found that substantially equimolar proportions of the ethylenically unsaturated ester and sulfur dioxide react together. However, starting molar ratios of sulfur dioxide to ethylenically unsaturated ester can range from 1 to 50:1 or more to facilitate the polymerization of the reactants and to provide, if desired, a reaction vehicle of liquid sulfur dioxide.

Temperatures employed in the preparation of the copolymers of the present invention may vary over a broad range generally from −50° C. to 50° C. and preferably from 0° to 30° C. and at pressures ranging from 1 p.s.i. to 20 p.s.i. and preferably at the autogenous pressure developed at the particular reaction conditions employed.

The sulfur dioxide/ethylenically unsaturated ester copolymers of the present invention either alone or modified with fillers, synthetic resins, pigments, dyes and plasticizers find use as molding compositions particularly in the manufacture of films and coatings.

To illustrate the manner in which the invention may be carried out, the following examples are given. It is to be understood, however, that the examples are for the purpose of illustration and the invention is not to be regarded as limited to any of the specific materials or conditions recited therein.

Example 1

A mixture of 40 grams of allyl cyclohexylpropionate and 251 grams of $SO_2$ were introduced into a pressure container. The mixture was cooled to 2° C. and exposed to gamma radiation emitted by a cobalt-60 source for 1 hour at a dosage rate 0.2 megarad per hour. Polymerization of the mixture was completed at that time. The excess $SO_2$ was evaporated, and the polymeric product remaining was washed with methanol to remove traces of unreacted ester. The polymeric product was dried in a vacuum oven at 50° C. The yield of polymer was ascertained to be 33 grams which was equivalent to a 62 percent conversion of the allyl ester to polymer. The product was determined to be a thermoplastic polymer having softening point of 100° C., a melting point of 140° C. and a decomposition point of 170° C.

Analysis of the polymer showed that the molar proportion of $SO_2$ groups to the allyl ester was 1:1.

The copolymer was plasticized by adding 40 parts of dioctyl phthalate to 100 parts of copolymer in a Waring Blendor. The softening point of the plasticized copolymer was 100° C., its melting point was 140° C., and its decomposition point was 190° C.

The plasticized composition was put through a roll mill at 125° C. for 10 minutes and then pressed on a platen press at 125° C. at 10,000 pounds of pressure. A clear flexible film was formed which had no odor of $SO_2$.

Example 2

In accordance with the general procedure of Example 1, a $SO_2$/allyl benzoate copolymer was prepared by reacting 61 grams of allyl benzoate with 297 grams of $SO_2$ exposed to an irradiation dose of 0.65 megarad at 15° C.

The yield of polymer was ascertained to be 30 grams which was equivalent to a 35 percent conversion of the allyl benzoate to copolymer. The product was determined to be a thermoplastic polymer having a softening point of about 140° C. and a melting point of 170° C. and a decomposition point of 200° C.

Analysis of the polymer showed that the molar proportion of $SO_2$ groups to the allyl ester was about 1:1.

A portion of the polymer product was compression molded at 130° C. and 10,000 pounds platen pressure for two minutes to prepare a shell white, transluscent semi-flexible film.

Example 3

To 114 grams of allyl heptanoate was added about 0.5 gram of methyl ethyl ketone peroxide. To this mixture with stirring was added liquid $SO_2$ in an open vessel until the solution became very thick and the vigorous reaction of the materials ceased. The polymer obtained was then precipitated by adding 200 milliliters of methanol to the mixture.

The precipitated polymer was washed with methanol to remove traces of the unreacted allyl heptanoate, and the polymer dried at 50° C. in a vacuum oven. The yield of polymer was ascertained to be 60 grams which amounted to a 40 percent conversion of allyl heptanoate to polymer.

Analysis of the polymer showed that the molar proportion of $SO_2$ groups to the allyl ester was 1:1. The polymeric product was thermoplastic and could be compression molded into a film.

Moldable polysulfones having similar properties to the foregoing may be obtained when any of the other mentioned ethylenically unsaturated esters are reacted in a similar manner with sulfur dioxide in place of those set forth above.

What is claimed is:

1. A moldable thermoplastic copolymer comprising the reaction product of sulfur dioxide and an unsaturated ester selected from the group consisting of allyl cyclohexylpropionate, allyl benzoate and allyl heptanoate.
2. A moldable thermoplastic copolymer comprising the reaction product of sulfur dioxide and allyl cyclohexylpropionate.
3. A moldable thermoplastic copolymer comprising the reaction product of sulfur dioxide and allyl benzoate.
4. A moldable thermoplastic copolymer comprising the reaction product of sulfur dioxide and allyl heptanoate.

References Cited

UNITED STATES PATENTS 2,314,067  3/1943  Barrett et al. _____ 260—79.3

JOSEPH L. SCHOFER, Primary Examiner.

JAMES A. SEIDLECK, Examiner.

D. K. DENENBERG, Assistant Examiner.